United States Patent
Azzam et al.

(10) Patent No.: US 10,139,742 B2
(45) Date of Patent: *Nov. 27, 2018

(54) ELECTROPHOTOGRAPHIC VARNISH COMPOSITION

(71) Applicant: HP Indigo B.V., Amstelveen (NL)

(72) Inventors: Tony Azzam, Nazareth (IL); Ilanit Mor, Kiryat Ono (IL); Samer Farran, Nes Ziona (IL); Guy Nesher, Nes Ziona (IL); Getahun Biadglin, Beth-She'an (IL); Haim Cohen, Modiin (IL); Yael Kowal-Blau, Givataim (IL); Albert Teishev, Rishon le-zion (IL); Nurit Carmel-Barnea, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/547,744

(22) PCT Filed: Feb. 11, 2015

(86) PCT No.: PCT/EP2015/052897
§ 371 (c)(1),
(2) Date: Jul. 31, 2017

(87) PCT Pub. No.: WO2016/128046
PCT Pub. Date: Aug. 18, 2016

(65) Prior Publication Data
US 2018/0017883 A1    Jan. 18, 2018

(51) Int. Cl.
*G03G 9/00* (2006.01)
*G03G 8/00* (2006.01)
*G03G 9/13* (2006.01)
*C09D 123/08* (2006.01)

(52) U.S. Cl.
CPC ......... *G03G 8/00* (2013.01); *C09D 123/0869* (2013.01); *G03G 9/13* (2013.01); *G03G 9/131* (2013.01); *G03G 9/132* (2013.01); *G03G 9/133* (2013.01)

(58) Field of Classification Search
CPC .................................. G03G 8/00; G03G 9/13
USPC ......................................................... 430/114
See application file for complete search history.

(56) References Cited

U.S. PATENT DOCUMENTS

| 6,489,375 B2 | 12/2002 | Stone et al. |
| 7,504,441 B2 | 3/2009 | Narayan-Sarathy et al. |
| 8,247,151 B2 | 8/2012 | Victor et al. |

(Continued)

FOREIGN PATENT DOCUMENTS

| JP | H08120218 | 5/1996 |
| WO | WO 2014/187497 | 11/2014 |

(Continued)

OTHER PUBLICATIONS

International Search Report and Written Opinion for International Application No. PCT/EP2015/052897 dated Oct. 16, 2015, 9 pages.

*Primary Examiner* — Mark A Chapman
(74) *Attorney, Agent, or Firm* — HP Inc. Patent Department (57) ABSTRACT

An electrophotographic varnish composition that comprises, in a liquid carrier, a polymeric resin; an epoxy-based cross-linking agent, a mono-epoxy diluent and a metal catalyst and/or a photo-initiator. Also described herein is a method for making such electrophotographic varnish composition.

15 Claims, 3 Drawing Sheets

(56) References Cited

U.S. PATENT DOCUMENTS

2010/0055602 A1 3/2010 Teshima
2012/0067759 A1 3/2012 Seung

FOREIGN PATENT DOCUMENTS

| WO | WO 2014/206492 | 12/2014 |
| WO | WO 2015/144212 | 10/2015 |

ELECTROPHOTOGRAPHIC VARNISH COMPOSITION

BACKGROUND

Electrophotographic printing process involves creating an image on a photoconductive surface, applying a specific ink having charged particles to the photoconductive surface and then transferring the charged particles in the form of the image to a print substrate. The photoconductive surface, which can be a cylinder and that is often termed a photo imaging plate (PIP), is selectively charged with a latent electrostatic image having image and background areas with different potentials.

The electrophotographic ink composition that is used herein comprises charged toner particles in a liquid carrier and can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member and then to the print substrate. Overprint varnishes are often used in order to enhance appearance and protect the printed image resulting from this electrophotographic process.

DETAILED DESCRIPTION

The present disclosure refers to an electrophotographic varnish composition that comprises, in a liquid carrier, an epoxy-based cross-linking agent; a mono-epoxy diluent; a polymeric resin; and a metal catalyst and/or a photo-initiator. The present disclosure refers also to a method for making such electrophotographic varnish composition.

Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present composition and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. The percent are by weight (wt %) unless otherwise indicated. As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, "image" refers to marks, signs, symbols, figures, indications, and/or appearances deposited upon a material or substrate with either visible or an invisible ink composition.

The compositions of the present disclosure are electrophotographic varnish compositions. The term "varnish", in the context of the present disclosure, refers to substantially colorless, clear or transparent compositions substantially free from pigment. As the compositions are substantially free from pigment, they may be used as varnishes in the methods described herein without contributing a further subtractive effect on the inks that would substantially affect the color of an underprinted colored image. It will be understood that other effects such as gamut expansion, saturation and brightness nevertheless may be enhanced. Such composition are referred to as varnish since they are often used in addition to ink composition. The term "varnish", in the context of the present disclosure, refers also to the fact that the composition can be used in addition to an ink composition, i.e. an ink composition that comprises colorants. The varnish composition could be added in top of the ink layer for examples. The term "electrophotographic composition" refers to a composition, which may be in liquid or powder form and that is suitable for use in an electrophotographic printing process. The liquid electrophotographic composition may comprise chargeable particles of a resin, which may be as described herein, dispersed in a liquid carrier, which may be as described herein. The varnish compositions of the present disclosure are referred to as "electrophotographic varnish compositions" since they are used in an electrophotographic printing process in addition or in combination with an electrophotographic ink composition. Such electrophotographic ink composition can comprise, for examples, a thermoplastic resin, a non-polar liquid, toner particles that can contain a colorant and a charge director.

As used herein, "electrostatic printing" or "electrophotographic printing" refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 50-400V/µm, or more, ins some examples 600-900V/µm, or more.

According to such process, an image is created on a photoconductive surface, by application of a liquid electrophotographic printing ink (LEP ink) having charged particles to the photoconductive surface and then transferring the charged particles in the form of the image to a print substrate. The photoconductive surface, or photo imaging plate (PIP), is selectively charged with a latent electrostatic image having image and background areas with different potentials. The electrostatic ink composition can be brought into contact with the selectively charged photoconductive surface. The charged toner particles, that are part of the LEP ink, adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate.

The electrophotographic printing ink (LEP ink or electrophotographic ink composition) can comprises a thermoplastic resin as the basis for the toner particles and a non-polar liquid as a liquid carrier in which the toner particles are dispersed. The toner particles can contain a colorant such as a pigment. A charge director, also called charge control agent or imaging agent, can also be added to the dispersion to induce charge on the particles.

The electrophotographic varnish composition of the present disclosure comprises a polymeric resin; a mono-epoxy diluent, an epoxy-based cross-linking agent, a metal catalyst and/or a photo-initiator for catalyzing the cross-linking and a carrier fluid. The electrophotographic varnish composition is compatible with existing electrostatic printing processes and protects an underlying print image. It is believed that the metal catalyst contained in the varnish composition enables partial to full thermal curing of the protective digital varnish on the blanket before the printed materials are transferred to the print substrate.

The varnish composition of the present disclosure can be cured using UV radiation after the composition has been transferred to the print substrate. The cross-linked polymeric resin overlying the print image improves the scratch resistance and durability of the printed materials. In addition, the varnish composition helps to improve the glossy appearance of the printed articles resulting from the electrophotographic printing process.

Mono-Epoxy Diluents

The electrophotographic varnish composition comprises, at least, a mono-epoxy diluent. Without being linked by any theory, it is believed that the mono-epoxy diluent helps to homogenize and stabilize the epoxy-based cross-linking agent in liquid carrier while in the same time, helps to increase the image gloss. The electrophotographic varnish composition comprises mono-epoxy diluent that is a linear mono-epoxy diluent, a branched mono-epoxy diluent or a mixture of linear and branched mono-epoxy diluents.

In some examples, the electrophotographic varnish composition comprises a mono-epoxy diluent that is a linear mono-epoxy diluent. Linear mono-epoxy diluent refers to organic molecule that can be made from a glycidyl ether moiety from one terminus and an aliphatic hydrocarbon chain ($C_4$-$C_{16}$) from the other terminus. Linear mono-epoxy diluent refers to the hydrophobic segment of the diluent that is not branched. Linear mono-epoxy diluent can be, for examples, octyl/decyl glycidyl ethers (mixture of $C_8$/$C_{10}$), dodecyl/tetradecyl (mixture of $C_{12}$/$C_{14}$) glycidyl ethers, glycidyl hexadecyl ether ($C_{16}$), etc. In some other examples, the electrophotographic varnish composition comprises mono-epoxy diluent that is a branched mono-epoxy diluent. Branched mono-epoxy diluent can be made from two hydrophobic chains which are connected together thorough one linkage. The two hydrophobic moieties are not necessary symmetric. Example of branched mono-epoxy diluent can be 2-ethylhexyl glycidyl ether. In yet some other examples, the electrophotographic varnish composition comprises mono-epoxy diluent that is a mixture of linear and branched mono-epoxy diluents.

Non-limiting examples of mono-epoxy diluent that can be used herein includes also 2-ethylhexyl glycidyl ether (as branched diluent); glycidyl hexadecyl ether (as linear diluent) or dodecyl-/tetradecyl glycidyl ether (as mixture of linear diluents of $C_{12}$/$C_{14}$, respectively). All diluents could be obtained from Sigma-Aldrich (Rehovot, Israel). In some examples, the mono-epoxy diluent is selected from the group consisting of 2-ethylhexyl glycidyl ether, glycidyl hexadecyl ether and dodecyl/tetradecyl glycidyl ether.

The mono-epoxy diluent can be present in the electrophotographic varnish composition, in an amount representing from about 0.1 wt % to about 10 wt % or, can be present, in an amount representing from about 1 wt % to about 5 wt % by total weight of the varnish composition.

In some examples, the ratio epoxy-based cross-linking agent/mono-epoxy diluent is between 1/1 and 1/0.8. Indeed, within such ratio the epoxy-based cross-linking agent and the mono-epoxy diluent will result in a stable and soluble emulsion in Isopar® for example.

Mono-epoxy diluents are epoxy compounds having one epoxide group, and are thus monofunctional epoxy-reactive diluents. Examples of mono-epoxy reactive diluents include without limitation: p-tertiarybutyl phenol glycidyl ether, cresyl glycidyl ether, 2-ethylhexyl glycidyl ether, and $C_8$-$C_{14}$ glycidyl ethers. The monofunctional epoxy-reactive diluent has an epoxide equivalent weight (EEW) that can be less than about 275, or less than about 225 or less than about 200. The term "reactive diluent" as used herein refers to a diluent which can be added to a material or a compound (for example, an epoxy resin), to modify properties of the material or the compound including, for example, reduction in viscosity. In some examples, mono-epoxy diluents are hydroxy ester functional epoxy ester diluents; it is meant herein that the reactive epoxy ester comprises an ester reaction product of an epoxide functional resin and a carboxylic acid. For instance, suitable epoxy ester diluents are produced by reacting a mono-functional epoxide resin with a mono-functional carboxylic acid. Epoxide functional resins can be referred to as an epoxy or oxirane group, where such groups terminate epoxy backbone chains and/or branched chains. Epoxy ester groups are formed by esterification of an epoxy group with a carboxyl functional material (R—COOH) to produce a hydroxy ester functional group. Useful epoxide functional resin comprise conventional epoxy resins, glycidyl functional resins, and alkylene oxide resins.

Epoxy-Based Cross-Linking Agent

The electrophotographic varnish composition comprises, at least, an epoxy-based cross-linking agent. Without being linked by any theory, it is believed that the presence of the epoxy-based cross-linking agent, in the electrophotographic varnish composition, helps to improve the scratch resistance and the durability of the image resulting from the LEP printing process. In other words, the presence of the epoxy-based cross-linking agent helps to improve the quality and the durability of the printed materials.

The epoxy-based cross-linking agent can have a molecular weight of less than 5,000 Daltons; or the epoxy-based cross-linking agent can have a molecular weight of less than 3,000 Daltons. In some examples, the epoxy-based cross-linking agent has a molecular weight of 1500 Daltons or less; in some other examples, the epoxy-based cross-linking agent has a molecular weight of 700 Daltons or less or of 600 Daltons or less. In yet some other examples, the epoxy-based cross-linking agent can have a molecular weight in the range of about 100 to about 1,500 Daltons, or in the range of about 200 to about 600 Daltons.

The epoxy-based cross-linking agent can be present in the electrophotographic varnish composition, in an amount representing from about 0.1 wt % to about 10 wt % or, can be present, in an amount representing from about 1 wt % to about 6 wt % by total weight of the varnish composition.

In some examples, the epoxy-based cross-linking agent may be of the formula (I), $(X)\text{-}(Y[Z\text{-}F]_m)_n$ wherein, in each $(Y\text{-}[Z\text{-}F]_m)_n$, Y, Z and F are each independently selected, such that: F is an epoxide, e.g. group of the formula —CH(O)CR$^1$H, wherein R$^1$ is selected from H and alkyl; Z is alkylene; Y is selected from: (i) a single bond, —O—, —C(=O)—O—, —O—C(=O)— and m is 1 or (ii) Y is —NH$_{2-m}$, wherein m is 1 or 2; n is at least 1, in some examples at least 2, in some examples at least 3, in some examples 1 to 4, in some examples 2 to 4; and X is an organic group.

In some examples, the cross-linking agent of formula (I) has at least two F groups; in some other examples, at least three F groups; and, in yet some other examples at least four F groups. X may comprise or be an organic group selected from optionally substituted alkyl, optionally substituted aryl, optionally substituted arylalkyl, optionally substituted alkylaryl, isocyanurate, and a polysiloxane. X may comprise one or more polymeric components; in some examples, the polymeric components may be selected from a polysiloxane (such as poly(dimethyl siloxane), a polyalkylene (such as polyethylene or polypropylene), an acrylate (such as methyl acrylate) and a poly(alkylene glycol) (such as poly(ethylene glycol) and poly(propylene glycol)), and combinations thereof. In some examples X comprises a polymeric backbone, comprising a plurality of repeating units, each of which is covalently bonded to (Y-[Z-F]$_m$), with Y, Z, F and m as described herein. X may be selected from a group selected from trimethyl propane, a branched or straight-chain C$_{1-5}$ alkyl, phenyl, methylene bisphenyl, trisphenylmethane, cyclohexane, isocyanurate.

X can be selected from (i) an alkane, which may be an optionally substituted straight chain, branched or cycloalkane, (ii) a cyclo alkane having at least two substituents that are Y-[Z-F]$_m$ and (iii) an aryl (such as phenyl). In some examples, X is selected from (i) a branched alkane, with at least at least two of the alkyl branches covalently bonded to (Y-[Z-F]$_m$) and (ii) a cyclo alkane having at least two substitutents that are Y-[Z-F]$_m$ and (iii) an aryl (such as phenyl) having at least two substituents that are Y-[Z-F]$_m$; Y is selected from (i) —O—, —C(=O)—O—, —O—C (=O)— and m is 1 or (ii) Y is —NH$_{2-m}$, wherein m is 1 or 2; Z is C$_{1-4}$ alkylene; F is an epoxide of the formula CH(O)CR$^1$H, wherein R$^1$ is selected from H and methyl, and in some examples F is an epoxide of the formula —CH(O)CR$^1$H in which R$^1$ is H.

X can be trimethyl propane, in which three methyl groups are each substituted with a (Y-[Z-F]$_m$) group (i.e. n is 3), in which Y is selected from —O—, —C(=O)—O—, —O—C (=O)— and m is 1, Z is Z is C$_{1-4}$ alkylene, in some examples methylene (—CH$_2$—) or ethylene (—CH$_2$—CH$_2$—); F is an epoxide of the formula —CH(O)CR$^1$H, wherein R$^1$ is selected from H and methyl, and in some examples F is an epoxide of the formula —CH(O)CR$^1$H in which R$^1$ is H.

X can be a phenyl having at least two substituents that are (Y[Z-F]$_m$) groups, in which each Y is independently selected from (i) —O—, —C(=O)—O—, —O—C(=O)— and m is 1 or (ii) Y is —NH$_{2-m}$, wherein m is 1 or 2; Z is C$_{1-4}$ alkylene, in some examples methylene or ethylene; F is an epoxide of the formula —CH(O)CR$^1$H, wherein R$^1$ is selected from H and methyl, and in some examples F is an epoxide of the formula —CH(O)CR$^1$H in which R$^1$ is H.

Z-F can be an epoxycycloalkyl group. In some examples, Z-F is an epoxycyclohexyl group. The cross-linking agent can comprise two or more epoxycycloalkyl groups, in some other examples two or more epoxycyclohexyl groups. The cross-linking agent can comprise two or more two or more epoxycycloalkyl groups, which are bonded to one another via a linker species; and the linker species may be selected from a single bond, optionally substituted alkyl, optionally substituted aryl, optionally substituted arylalkyl, optionally substituted alkylaryl, isocyanurate, a polysiloxane, —O—, —C(=O)—O—, —O—C(=O)—, and amino and combinations thereof. In some examples, in formula (I) Y is a single bond, X is an organic group of the formula —X$^1$-Q-X$^2$—, wherein X$^1$, X$^2$ are each independently selected from a single bond and alkyl, and Q is selected from alkyl, —O—, —C(=O)—O—, —O—C(=O)—, and amino; n is 2; m is 1 and Z-F is an epoxycycloalkyl group, in some examples Z-F is an epoxycyclohexyl group. In formula (I) Y can be a single bond, X is an organic group of the formula —X$^1$-Q-X$^2$—, wherein X$^1$, X$^2$ are each independently selected from a single bond and C$_{1-4}$ alkyl, and Q is selected from C$_{1-4}$ alkyl, —O—, —C(=O)—O—, —O—C(=O)—; n is 2; m is 1 and Z-F is an epoxycyclohexyl group, optionally a 3,4 epoxycyclohexylgroup. In some examples, Y is a single bond, X is an organic group of the formula —X$^1$-Q-X$^2$—, wherein one of X$^1$ and X$^2$ is a single bond and the other of X$^1$ and X$^2$ is C$_{1-4}$ alkyl, and Q is selected —O—, —C(=O)—O—, —O—C(=O)—; n is 2; m is 1 and Z-F is an epoxycyclohexyl group, optionally a 3,4 epoxycyclohexylgroup.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc. As used herein, "heteroatom" may refer to nitrogen, oxygen, halogens, phosphorus, or sulfur. As used herein, "alkyl", or similar expressions such as "alk" in alkaryl, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example. The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more, and may be selected from, phenyl and naphthyl.

The cross-linking agent can be selected from the group consisting of 1,2,7,8-diepoxy octane, trimethylolpropane triglycidyl ether, resorcinol diglycidyl ether, N,N-diglycidyl-4-glycidyloxyaniline, 4,4'-methylenebis(N,N-diglycidylaniline), tris(4-hydroxyphenyl)methane triglycidyl ether, diglycidyl 1,2-cyclohexanedicarboxylate, 1,4-cyclohexanedimethanol diglycidyl ether (which may be mixture of cis and trans), tris(2,3-epoxypropyl) isocyanurate, neopentyl glycol diglycidyl ether, bisphenol A diglycidyl ether, bisphenol A propoxylate diglycidyl ether, 3,4-epoxycyclohexylmethyl 3,4-epoxycyclohexanecarboxylate, poly[(o-cresyl glycidyl ether)-co-formaldehyde], poly(ethylene-co-glycidyl methacrylate), poly(ethylene-co-methyl acrylate-co-glycidyl methacrylate), poly(bisphenol A-co-epichlorohydrin) glycidyl end-capped, poly(ethylene glycol) diglycidyl ether and poly(propylene glycol) diglycidyl ether.

The epoxy-based cross-linking agent can be inactive at ambient or room temperature. Or the epoxy-based cross-linking agent is highly reactive at a temperature above ambient temperature. The epoxy-based cross-linking agent can be highly reactive at a temperature greater than about 50° C., for example greater than about 60° C., for example greater than about 70° C., for example greater than about 80° C., for example greater than about 90° C., for example greater than about 100° C., for example about 110° C.

The epoxy-based cross-linking agent is compatible with the liquid carrier of the varnish composition. In some examples, the epoxy-based cross-linking agent is soluble in the carrier of the varnish composition. In some other examples, the cross-linking agent is 3,4-epoxycyclohexylmethyl 3,4-epoxycyclohexanecarboxylate.

In some examples, the electrophotographic varnish composition contains epoxy-based cross-linking agent that are low-molecular weight epoxy-based cross-linkers or High-molecular weight epoxy-based cross-linkers. Without limitation, low-molecular weight epoxy-based cross-linkers include components selected from the group consisting of 3,4-Epoxycyclohexylmethyl 3,4-epoxycyclohexanecarboxylate ("di-epoxycyclohexane" or "DECH"); neopentyl glycol diglycidyl ether (NPGDGE); 4,4'-methylenebis(N,N-diglycidylaniline) (MBDGA); 1,2,7,8-diepoxyoctane (DEOC); resorcinol diglycidyl ether (RDGE); trimethylolpropane triglycidyl ether (TMPTGE); N,N-Diglycidyl-4-glycidyloxyaniline (DGGOA); tris(4-hydroxyphenyl)methane triglycidyl ether (THPMTGE); diglycidyl 1,2-cyclohexanedicarboxylate (DGCHDC); 1,4-Cyclohexanedimethanol diglycidyl ether (mixture of cis- and trans-) (CHDMDGE); tris(2,3-epoxypropyl) isocyanurate (TEPIC); bisphenol A diglycidyl ether (BPADGE) and bisphenol A propoxylate diglycidyl ether (BAPDGE). All these ingredients are available from Sigma-Aldrich (Rehovot, Israel).

Without limitation, High-molecular weight epoxy-based cross-linkers include components selected from the group consisting of poly(ethylene-co-methyl acrylate-co-glycidyl methacrylate) [PEMAGM]; poly[(phenyl glycidyl ether)-co-formaldehyde] [PPGE]; poly(bisphenol A-co-epichlorohydrin); glycidyl end-capped [PBPADGE] (Mn~377 and 1,750); poly(ethylene-co-glycidyl methacrylate) [PEGM]; poly[(o-cresyl glycidyl ether)-co-formaldehyde] [PCGE] (Mn=1,080); poly(dimethyl siloxane) diglycidyl ether terminated [PDMSDGE]; poly(ethylene glycol) diglycidyl ether (PEGDGE, Mn=500); poly(propylene glycol) diglycidyl ether (PPGDGE, Mn=380 and 640) and Poly[dimethylsiloxane-co-(2-(3,4-epoxycyclohexyl)ethyl)methylsiloxane] P[DMS-co-ECHMS]. All these ingredients are available from Sigma-Aldrich (Rehovot, Israel).

Metal Catalyst

In some examples, the electrophotographic varnish composition comprises a metal catalyst or a photo-initiator. In some other examples, the electrophotographic varnish composition comprises a metal catalyst and a photo-initiator. Such metal catalyst and/or photo-initiator are used in order to catalyze the cross-linking of the polymeric resin with the epoxy-based cross-linking agent. In some examples, the varnish composition comprises a metal catalyst. The metal catalyst may be activated by thermal energy. The metal catalyst may be substantially inactive at ambient or room temperature by which will be understood that the metal catalyst does not catalyze the cross-linking reaction. The metal catalyst may be activated at temperatures greater than 50° C., for example greater than greater than 60° C., greater than 70° C., greater than 80° C., greater than 90° C., greater than 100° C., for example about 110° C. The metal catalyst may be activated by the thermal energy of the intermediate transfer member, or blanket.

The metal catalyst may be present in an amount sufficient to catalyze cross-linking of the polymeric resin with the epoxy-based cross-linking agent. The metal catalyst may be present in an amount sufficient to catalyze cross-linking of the polymeric resin with the epoxy-based cross-linking agent whilst the varnish composition is being transferred on the intermediate transfer member, or blanket.

In some examples, the metal catalyst is present, in the electrophotographic varnish composition, in an amount representing less than 5 wt %, or in an amount representing less than 3 wt %, in an amount representing less than 1 wt %, or in an amount of less than less than 0.5 wt % of the total weight of the electrophotographic varnish composition.

The metal catalyst can be any catalyst that is capable of promoting cross-linking of an epoxy-based system.

In some examples, the metal catalyst is a chromium complex or a zinc complex. The chromium complex can be a chromium (III) complex or a chromium (VI) complex. The zinc complex can be a zinc (I) complex or a zinc (II) complex. Examples of suitable catalysts include the Nacure® series of catalysts from King Industries, Inc., for example Nacure® XC-259, the K-Pure® series of catalysts, also from King Industries, Inc., for example K-Pure® CXC-1765, and the Hycat® series of catalysts from Dimension Technologies Chemical Systems, Inc., for example Hycat® 2000S. In some examples, the electrophotographic varnish composition comprises a metal catalyst that is present in an amount representing less than 5 wt % of the total weight of the electrophotographic varnish composition and that is a chromium complex or a zinc complex.

Photo-Initiator

In some examples, the varnish composition comprises a photo-initiator. The photo-initiator, or UV initiator, is an agent that initiates a reaction upon exposure to a desired wavelength of UV light to cure the composition, as described herein, after its application to a substrate by cross-linking the polymeric resin with the epoxy-based cross-linking agent.

The photo-initiator can be a cationic photo-initiator or a radical photo-initiator. The photo-initiator may be a single compound or a mixture of two or more compounds. It can be present in the composition in an amount sufficient to cure the applied composition. In some examples, the photo-initiator is present in the composition in an amount representing from about 0.01 to about 10 wt %, or from about 1 to about 5 wt % of the total weight of the electrophotographic varnish composition. In one example the photo-initiator may be present in an amount of less than 5 wt %; or in an amount of less than 3 wt %; or in an amount of less than 1 wt % for examples of the total weight of the electrophotographic varnish composition.

In some examples, the electrophotographic varnish composition comprises a photo-initiator that is present in an amount representing from about 0.01 to about 10 wt % of the total weight of the electrophotographic varnish composition and that is a cationic photo-initiator.

Suitable examples of cationic photo-initiators are Esacure®1064 (50% propylene carbonate solution of arylsulfonium hexafluorophosphate (mono+di) salts); diphenyliodonium nitrate; (tert-butoxycarbonylmethoxynaphthyl)-diphenylsulfonium triflate; 1-naphthyl diphenylsulfonium triflate; (4-fluorophenyl) diphenylsulfonium triflate; Boc-methoxyphenyl-diphenylsulfonium triflate (all available from Sigma-Aldrich).

Examples of photo-initiator include also, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl) phosphine oxide, phenyl bis(2,4,6-trimethylbenzoyl)phosphine oxide, 2-hydroxy-2-methyl-1-phenyl- 1-propanone, benzyl-dimethyl ketal, 2-methyl-1-[4-(methylthio)phenyl-]-2-morpholinopropan-1-one, or combinations of two or more of the above. Amine synergists may also be used, such as, for example, ethyl-4-dimethylaminobenzoate, 2-ethylhexyl-4-dimethylamino benzoate.

The varnish composition may include a UV stabilizer, i.e. an agent that can assist with scavenging free radicals. Examples of UV stabilizers include, by way of illustration and not limitation, quinine methide (Irgastab®UV 22 from BASF Corporation) and Genorad®16 (Rahn USA Corporation) and combinations thereof. In some examples, a photosensitizer may be used with the photo-initiator in amounts ranging from about 0.01 to about 10 wt %, or from about 1 to about 5 wt %, based on the total weight of the varnish composition. A photosensitizer absorbs energy and then transfers it to another molecule, usually the photo-initiator. Photosensitizers are often added to shift the light absorption characteristics of a system. Suitable examples of photosensitizers include, but are not limited to thioxanthone, 2-isopropylthioxanthone and 4-isopropylthioxanthone.

Polymeric Resin

The varnish composition comprises a polymeric resin. The polymeric resin may comprise a thermoplastic polymer. A thermoplastic polymer is sometimes referred to as a thermoplastic resin. In some examples, the polymeric resin may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. Examples of the polymer having acidic side groups will now be described. The polymer having acidic side groups may have an acidity of 50 mg KOH/g or more, or an acidity of 70 mg KOH/g or more, or an acidity of 90 mg KOH/g or more, or an acidity of 100 mg KOH/g or more, or an acidity of 110 mg KOH/g or more, in some examples. The polymer having acidic side groups may have an acidity of 200 mg KOH/g or less, or of 180 mg or less, or 130 mg KOH/g or less, or of 120 mg KOH/g or less in some examples. Acidity of a polymer, as measured in mg KOH/g can be measured using standard procedures known in the art, for example using the procedure described in ASTM D1386.

The resin may comprise a polymer having acidic side groups that has a melt flow rate of less than about 70 g/10 minutes, or of less than about 50 g/10 minutes or less, or of less than about 30 g/10 minutes, or of less than about 10 g/10 minutes in some examples. All polymers having acidic side groups and/or ester groups in the particles each individually can have a melt flow rate of less than 90 g/10 minutes, or of less than 80 g/10 minutes, or of less than 60 g/10 minutes, in some examples.

The polymer having acidic side groups can have a melt flow rate of about 10 g/10 minutes to about 120 g/10 minutes, or of about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, such as metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SUR-LYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, a melt viscosity of 10000 poise or less, or of 1000 poise or less, or of 50 poise or less, or of 10 poise or less in some examples; said polymer may be a polymer having acidic side groups as described herein. The resin may comprise a first polymer having a melt viscosity of 15000 poise or more, or of 20000 poise or more, or of 50000 poise or more, or of 70000 poise or more; and in some examples, the resin may comprise a second polymer having a melt viscosity less than the first polymer, in some examples a melt viscosity of 15000 poise or less, or of a melt viscosity of 10000 poise or less, or of 1000 poise or less, or of 100 poise or less, or of 50 poise or less, or of 10 poise or less in some examples. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, or of a melt viscosity of 10000 poise or less, or of 1000 poise or less, or of 100 poise or less, or of 50 poise or less, or of 10 poise or less in some examples; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin in the varnish composition comprises a single type of polymer, the polymer (excluding any other components of the electrophotographic varnish composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrophotographic varnish composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The polymeric resin may comprise two different polymers having acidic side groups that are co-polymers of ethylene and an ethylenically unsaturated acid of either acrylic acid or methacrylic acid, or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer. In some examples, the polymeric resin comprises a polymer selected from ethylene or propylene acrylic acid co-polymers and ethylene or propylene methacrylic acid co-polymers.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the electrophotographic varnish composition and/or the varnish printed on the print substrate, e.g. the total amount of the polymer or polymers having acidic side groups and polymer having ester side groups. The polymer having ester side groups may constitute 5wt % or more by weight of the total amount of the resin polymers, e.g. thermoplastic resin polymers, or of 8 wt % or more, or of 10 wt % or more, or of 15 wt % or, or of 20 wt %, or in some examples of 30 wt % or more, or of 35 wt % or more by weight of the total amount of the resin polymers, e.g. thermoplastic resin polymers, in the electrophotographic composition and/or the varnish printed on the print substrate. The polymer having ester side groups may constitute from 5% to 50% by weight of the total amount of the resin polymers, e.g. thermoplastic resin polymers, in the electrophotographic composition and/or the varnish printed on the print substrate, in some examples 10% to 40% by weight of the total amount of the resin polymers, e.g. thermoplastic resin polymers, in the electrophotographic composition and/or the varnish printed on the print substrate, in some examples 5% to 30% by weight of the total amount of the resin polymers, e.g. thermoplastic resin polymers, in the electrophotographic composition and/or the varnish printed on the print substrate, in some examples 5% to 15% by weight of the total amount of the resin polymers, e.g. thermoplastic resin polymers, in the electrophotographic composition and/or the varnish printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403®, Nucrel 407®, Nucrel 609HS®, Nucrel 908HS®, Nucrel 1202HC®, Nucrel 30707®, Nucrel 1214®, Nucrel 903®, Nucrel 3990®, Nucrel 910®, Nucrel 925®, Nucrel 699®, Nucrel 599®, Nucrel 960®, Nucrel RX 76®, Nucrel 2806®, Bynell 2002, Bynell 2014, Bynell 2020 and Bynell 2022, (sold by E. I. du PONT)), the Aclyn family of toners (e.g. Aclyn® 201 , Aclyn® 246, Aclyn® 285, and Aclyn® 295), and the Lotader family of toners (e.g. Lotader° 2210, Lotader® 3430, and Lotader® 8200 (sold by Arkema)).

The resin can constitute about 5 to 90%, in some examples about 50 to 80%, by weight of the solids of the electrophotographic composition and/or the varnish printed on the print substrate. The resin can constitute about 60 to 95%, in some examples about 70 to 95%, by weight of the solids of the electrophotographic composition and/or the varnish printed on the print substrate.

As used herein, "co-polymer" refers to a polymer that is polymerized from at least two monomers. As used herein, "melt flow rate" can refer to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrophotographic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the toner composition.

As used herein, "melt viscosity" can refer to the ratio of shear stress to shear rate at a given shear stress or shear rate. Testing is performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the electrophotographic composition.

Charge Director and Charge Adjuvant

The electrophotographic varnish composition can further comprise a charge director. A charge director can be added to an electrophotographic composition to impart a charge of a desired polarity and/or maintain sufficient electrophotographic charge on the particles of an electrophotographic varnish composition. The charge director may comprise ionic compounds, including, but not limited to, metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate®, neutral Barium Petronate®, and basic Barium Petronate®), polybutylene succinimides (e.g. OLOA® 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminium salts of sulfonic acid. The sulfonic acids may include, but are not limited to, alkyl sulfonic acids, aryl sulfonic acids, and sulfonic acids of alkyl succinates (e.g. see WO 2007/130069). The charge director can impart a negative charge or a positive charge on the resin-containing particles of an electrophotographic varnish composition.

The charge director can comprise a sulfosuccinate moiety of the formula $$[R_a—O—C(O)CH_2CH(SO_3^-)C(O)—O—R_b],$$

where each of $R_a$ and $R_b$ is an alkyl group. In some examples, the charge director comprises nanoparticles of a simple salt and a sulfosuccinate salt of the formula $MA_n$, wherein M is a metal, n is the valence of M, and A is an ion of the formula $[R_a—O—C(O)CH_2CH(SO_3^-)C(O)—O—R_b]$, where each of $R_a$ and $R_b$ is an alkyl group, or other charge directors as found in WO2007130069, which is incorporation herein by reference in its entirety. As described in WO2007130069, the sulfosuccinate salt of the formula $MA_n$ is an example of a micelle forming salt. The charge director may be substantially free or free of an acid of the formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf^-$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In some examples, in the formula $[R_a—O—C(O)CH_2CH(SO_3^-)C(O)—O—R_b]$, each of $R_a$ and $R_b$ is an aliphatic alkyl group. Each of $R_a$ and $R_b$ independently can be also a $C_{6-25}$ alkyl. Said aliphatic alkyl group can be linear or can be branched. In some examples, said aliphatic alkyl group includes a linear chain of more than 6 carbon atoms. In some other examples, $R_a$ and $R_b$ are the same. In yet some other examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or the formula $MA_a$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrophotographic varnish composition, the charge director can constitute about 0.001% to 20%, or about 0.01 to 20% by weight, or about 0.01 to 10% by weight, or about 0.01 to 1% by weight of the solids of the electrophotographic varnish composition and/or varnish printed on the print substrate. The charge director can constitute about 0.001 to 0.15% by weight of the solids of the electrophotographic varnish composition and/or varnish printed on the print substrate, or about 0.001 to 0.15%, or about 0.001 to 0.02% by weight of the solids of the electrophotographic varnish composition and/or varnish printed on the print substrate. In some examples, the charge director imparts a negative charge on the electrophotographic varnish composition. The particle conductivity may range from 50 to 500 pmho/cm, or about from 200-350 pmho/cm.

The electrophotographic varnish composition can include a charge adjuvant. A charge adjuvant may be present with a charge director, and may be different to the charge director, and act to increase and/or stabilize the charge on particles, e.g. resin-containing particles, of an electrophotographic composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert- butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the electrophotographic varnish composition and/or varnish printed on the print substrate. The charge adjuvant can constitute about 0.5 to 4% by weight of the solids of the electrophotographic varnish composition and/or varnish printed on the print substrate. The charge adjuvant can constitute about 1 to 3% by weight of the solids of the electrophotographic varnish composition and/or varnish printed on the print substrate.

Liquid Carrier

The electrophotographic varnish composition according to the present disclosure comprises a liquid carrier. As used herein, "carrier fluid", "liquid carrier," "carrier," or "carrier vehicle" refers to the fluid in which the polymers, particles, colorant, charge directors and other additives can be dispersed to form a liquid electrostatic composition or electrophotographic composition. The liquid carriers may include a mixture of a variety of different agents, such as surfactants, co-solvents, viscosity modifiers, and/or other possible ingredients. In some examples, the electrophotographic varnish composition is a liquid electrophotographic varnish composition.

In some examples, the varnish composition is or has been formed from an electrostatic varnish composition. Before application to the print substrate in the electrostatic printing process, the varnish may be an electrophotographic varnish composition, which may be in dry form, such as in the form of flowable particles comprising the thermoplastic resin for example. Alternatively, before application to the print substrate in the electrostatic printing process, the electrophotographic varnish composition may be in liquid form; and may comprises a liquid carrier in which is suspended particles of the thermoplastic resin.

The liquid carrier can act as a dispersing medium for the other components in the electrophotographic varnish composition. The liquid carrier can comprise or be a hydrocarbon, silicone oil, vegetable oil, etc. The liquid carrier can include, but is not limited to, an insulating, non-polar, non-aqueous liquid that can be used as a medium for toner particles. The liquid carrier can include compounds that have a resistivity in excess of about 109 ohm-cm. The liquid carrier may have a dielectric constant below about 5; or, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G®, Isopar-H®, Isopar-L®, Isopar-M®, Isopar-K®, Isopar-V®, Norpar 12®, Norpar 13®, Norpar 15®, Exxol D40®, Exxol D80®, Exxol D100®, Exxol D130®, and Exxol D140® (each sold by Exxon corporation); Teclen N-16®, Teclen N-20®, Teclen N-22®, Nisseki Naphthesol L®, Nisseki Naphthesol M®, Nisseki Naphthesol H®, #0 Solvent L®, #0 Solvent M®, #0 Solvent H®, Nisseki Isosol 300®, Nisseki Isosol 400®, AF-4®, AF-5®, AF-6® and AF-7® (each sold by Nippon oil corporation); IP Solvent 1620® and IP Solvent 2028® (each sold by Idemitsu Petrochemical co., ltd.); Amsco OMS® and Amsco 460® (each sold by American mineral spirits corp.); and Electron, Positron, New II, Purogen HF (100% synthetic terpenes) (sold by Ecolink).

Before printing, the liquid carrier can constitute from about 20 wt % to about 99.5 wt % by total weight of the electrophotographic varnish composition; or it can constitute from about 50 wt % to 99.5 wt % by total weight of the electrophotographic varnish composition. Before printing, the liquid carrier may constitute about 40 wt % to about 90 wt % by weight of the electrophotographic varnish composition or may constitute about 60 wt % to about 80 wt % by weight of the electrophotographic varnish composition. Before printing, the liquid carrier may constitute about 90 wt % to about 99.5 or about 95 wt % to 99 wt % by weight of the electrophotographic varnish composition.

The varnish, when printed on the print substrate, may be substantially free from liquid carrier. In an electrophotographic printing process and/or afterwards, the liquid carrier may be removed, e.g. by an electrophoresis processes during printing and/or evaporation, such that substantially just solids are transferred to the print substrate. Substantially free from liquid carrier may indicate that the varnish printed on the print substrate contains less than 5 wt % liquid carrier, in some examples, or less than 2 wt % liquid carrier, or less than 1 wt % liquid carrier, or less than 0.5 wt % liquid carrier. In some examples, the varnish printed on the print substrate is free from liquid carrier.

Other Additives

The electrophotographic varnish composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the varnish film to the print substrate, e.g. from an intermediate transfer member, which may be a heated blanket.

Method of Forming an Electrophotographic Varnish Composition

Also provided herein is a method of manufacturing an electrophotographic varnish composition, the method comprising mixing, in a liquid carrier, a polymeric resin, an epoxy-based cross-linking agent, a mono-epoxy diluent and a metal catalyst and/or a photo-initiator to form the electrophotographic composition. The addition of the metal catalyst and/or of the photo-initiator will help catalyzing the cross-linking.

The method includes mixing the resin and the liquid carrier under appropriate conditions, in the presence of an epoxy-based cross-linking agent, a mono-epoxy diluent and a metal catalyst and/or a photo-initiator. A charge adjuvant, such as aluminium stearate, can be added to form the particles including the resin, the cross-linking agent the metal catalyst and/or the photo-initiator. In some examples, the resin and liquid carrier may be mixed before the cross-linking agent and metal catalyst and/or a photo-initiator are added. A charge director may also be added at the time that the cross-linking agent and metal catalyst and/or a photo-initiator are added into the liquid carrier. The metal catalyst and/or the photo-initiator may be added after the resin, liquid carrier, epoxy-based cross-linking agent and mono-epoxy diluent have been mixed. One or more further additives as described herein may be added at any time during the method. The steps described above are not intended to be bound by any particular order. For example, the mixing of the resin with the liquid carrier may be performed before, after, or concurrently with the step of combining the charge director and/or cross-linking agent with the liquid carrier. Additionally, the steps may be combined or performed in a different order as is known in the art. Additionally, the steps may include other necessary processing steps as is known in the art.

Printing Process and Print Substrate

Also provided is a method of electrophotographic printing, the method comprises printing the electrophotographic varnish composition that comprises, in a liquid carrier, an epoxy-based cross-linking agent; a mono-epoxy diluent; a polymeric resin; and a metal catalyst and/or a photo-initiator, onto a substrate using an electrophotographic printer. In some examples, the substrate is a printed article that has been printed by an electrophotographic ink composition.

The resulting printed article, or article, will thus comprise a substrate that has been printed with an electrophotographic ink composition and with an electrophotographic varnish composition comprising, in a liquid carrier, an epoxy-based cross-linking agent; a mono-epoxy diluent; a polymeric resin; and a metal catalyst and/or a photo-initiator.

In some examples, the surface on which the varnish layer is formed or developed may be on a rotating member, e.g. in the form of a cylinder. The surface on which the varnish is formed or developed may form part of a photo imaging plate (PIP). The method may involve passing the varnish composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

In some examples, the varnish composition is printed onto the print substrate after a printed image has been printed. In some examples, the varnish composition is printed as a final separation, or print step, after all print separations relating to the image have been printed. References to print separation, or print step, are to be understood as referring to a single iteration of the three major transfer steps of the printing process: t0 transfer of a printing composition from the binary ink developer (BID) to the photo imaging plate (PIP), followed by t1 transfer (or 1st transfer) from the PIP to the intermediate transfer member (ITM), and finally t2 transfer (or 2nd transfer) from the ITM to the substrate. In CMYK printing, the ink formulations are printed in turn, or separately, hence print separations. In one example, the varnish composition is printed as a final separation after all CMYK ink separations have taken place, i.e. all inks have been transferred to the substrate. In one example, the varnish composition is printed simultaneously with the last ink separation.

During an electrostatic printing process, the intermediate transfer member operates at a temperature in the region of 100° C., or of about 105° C. In the example in which the cross-linking reaction is catalyzed by the metal catalyst, this temperature is sufficient to activate the epoxy-based cross-linking agent and metal catalyst so that the varnish composition is at least partially cured, if not fully cured at the time that it is transferred to the print substrate.

In the example in which the cross-linking reaction is catalyzed by UV radiation in the presence of a photo-initiator, the print substrate may be exposed to a UV irradiation source shortly after the varnish composition has been printed onto the substrate, and before image dryness.

Also provided in an aspect is a print substrate, having printed thereon an electrophotographic varnish composition comprising a polymeric resin, a metal catalyst and/or a photoinitiator, an epoxy-based cross-linking agent and a mono-epoxy diluent such that the polymeric resin is cross-linked.

The print substrate, or media substrate, may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrophotographic ink composition and varnish composition are printed onto the print substrate.

EXAMPLES

Materials and Ingredients

TABLE 1

| Ingredient name | Nature of the ingredient | supplier |
| --- | --- | --- |
| Nucrel ®925 | polymeric resin | DuPont |
| Nucrel ®2806 | polymeric resin | DuPont |
| Bynel ®2022 | polymeric resin | DuPont |
| Isopar ®L | Isoparaffinic fluids | Exxon Mobil |
| Marcol ®82 | liquid carrier | Exxon mobile |
| Nacure ®XC-259 (~10% metal content) | Metal Catalysts (Zinc-based) | King Industries Inc. |
| DECH (3,4-Epoxycyclohexylmethyl 3,4-epoxycyclohexane-carboxylate) | epoxy-based cross-linking agent | Sigma-Aldrich |

Example 1

Preparation of Electrophotographic Varnish Composition 1 kg of a resin mixture (comprising about 720 grams of Nucrel 925, about 180 grams of Nucrel®2806 and about 100 grams of Bynel®2022) are loaded into a Ross Mixer Paste. 1500 grams of Isopar®L is added and the mixture is heated to 130° C. under constant mixing (100 rpm). After 3 h, the heating is ceased and the mixture is allowed to gradually cool to room temperature under constant mixing. Cooling is performed under constant mixing (50 rpm) and during at least 12-16 h. The percentage of the non-volatile solids (% NVS) in the paste is within a range of about 41 to about 43%.

Preparation of varnish solids: 1 Kg of the freshly-prepared paste, 1.3 Kg of Isopar®L and 3.52 grams of the charge adjuvant (aluminum tristearate) are loaded into an Attritor containing metal grinding balls. The grinding process is performed at 30° C. (mixing speed of 250 rpm) for 12-15 hours. After that, grinding is ceased and a small sample from the ground is taken, dispersed in 0.1% BBP (in Isopar®L) and measured by Malvern for particle size distribution. Grinding is terminated when the particle size reached 1 micron (μm) or below. After that, the ground is diluted with Isopar®L, mixed for few hours and transferred to a receiving container. The percentage of the non-volatile solids (% NVS) of the obtained varnish is in the range of about 10 to 13%.

Preparation of varnish working dispersion (WD) (Varnish # 1): A varnish solids of 10-13% NVS is allowed to mix in a shaker (200 rpm) for at least 24 h prior to processing. A 3% NVS varnish is prepared by diluting a predetermined solid content with Isopar-L. A WD contains 3% solid varnish particles (3% NVS), Marcol®82 (0.5 wt % to total weight of the WD, i.e. solid and Isopar-L combined) and charge director (SCD). SCD (charge director) content needed for charging is in the range of 2-15 mg per one gram of solid varnish. The WD is allowed to mix in a shaker (200 rpm) for at least 24 h prior to loading on the press to allow sufficient charging and homogenization.

Preparation of varnish working dispersion (WD) containing 3,4-epoxycyclohexylmethyl 3,4-epoxycyclohexanecarboxylate (DECH) (Varnish # 2 and #3): About 2 wt % of DECH is added to a 3% NVS varnish WD in order to produce the Varnish #2. To this is added 0.5 wt % (to total solids in varnish) of the corresponding metal catalyst (Nacure®XC-259) in order to produce the Varnish #3. In both mixtures, charge director (SCD) at 15 mg per one gram of varnish ink is added to the mixtures. The mixtures are allowed to mix in a shaker for at least 12 h to reach sufficient charging and homogenization. For acceleration, high-shear mixing can be applied at 10K rpm for 10 minutes.

Preparation of varnish working dispersion (WD) containing DECH and dispersing diluents (Varnish # 4 and 5): DECH and a diluent (2-Ethylhexyl glycidyl ether or glycidyl hexadecyl ether) are mixed at 1/1 weight ratio. The mixture is allowed to shake for 2 minutes in order to achieve complete solubilization of the DECH in the diluent. After, the DECH/diluent blend is diluted in Isopar to give a stable and transparent solution. Next, the DECH/diluent blend is added to the varnish working dispersion followed by the catalyst and the charge director. The mixture is allowed to shake for at least 3 hours before loading on the press.

The different electrophotographic varnish compositions, formulations and amounts, are listed in Table 2. All percentages are expressed in wt % of the total weight of the varnish composition.

TABLE 2

| Components | Varnish #1 | Varnish #2 | Varnish #3 | Varnish #4 | Varnish #5 |
|---|---|---|---|---|---|
| Varnish working dispersion (WD) | 100 | 99.5 | 97.5 | 95.5 | 95.5 |
| NACURE ®XC-259 | — | 0.5 | 0.5 | 0.5 | 0.5 |
| DECH | — | — | 2.0 | 2.0 | 2.0 |
| 2-Ethylhexyl glycidyl ether (branched diluent blend) | — | — | — | 2.0 | — |
| glycidyl hexadecyl ether (linear diluent blend) | — | — | — | — | 2.0 |

Example 2

Varnish Ink Dispersions Performances on Scratch-Resistance

A media (Euroart® substrate, 135 gsm) is used in an indigo press (HP Indigo 7500, Series 3) with the commercially available Electroink 4.5 at 400% K.

The media is then submitted to "scratch" resistance test in order to evaluate the durability performances provided by the use of vanish compositions. The test is done on printed sample having no varnish composition or the varnish compositions # 1 to 5 applied to the image. The test is performed using Taber® shear (scratch tester model 551). Tungsten carbide tip is installed to cause damage to print when print is fixed on iron plate. Scratch movement occurs like "phonograph" as circular scratch which evaluated by debris collected and weight. The scratch resistance performance is measured in weight of ink-debris (amount of image ink removed measured in mg).

Figure 1:
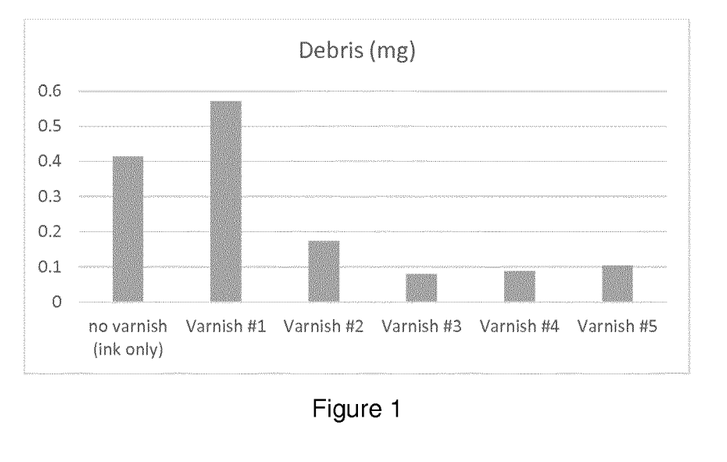
FIG. 1 is a graphic illustrating the results of scratch-resistance obtained with various examples of electrophotographic varnish compositions.
Figure 2:
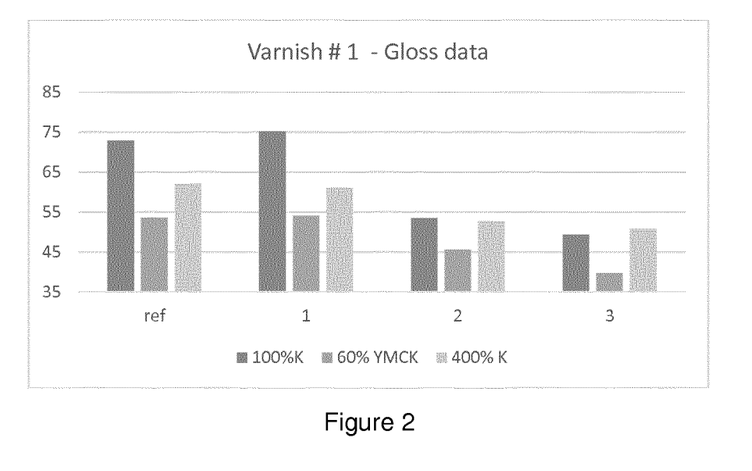
FIGS. 2 to 6 are graphics illustrating the results of gloss measurements obtained with various examples of electrophotographic varnish compositions.
Figure 3:
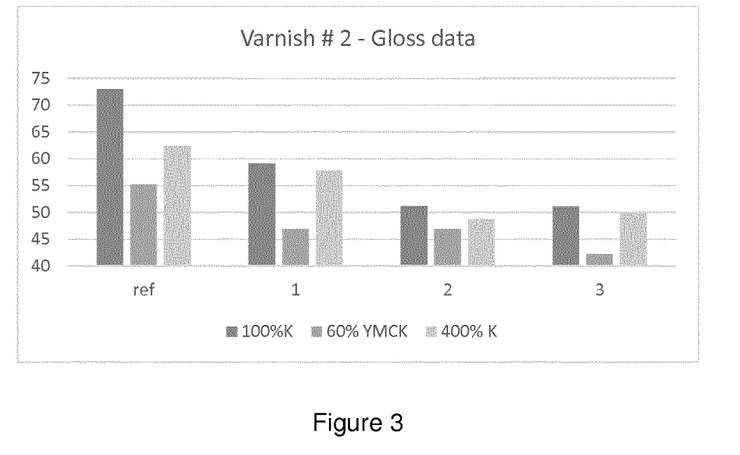
Figure 4:
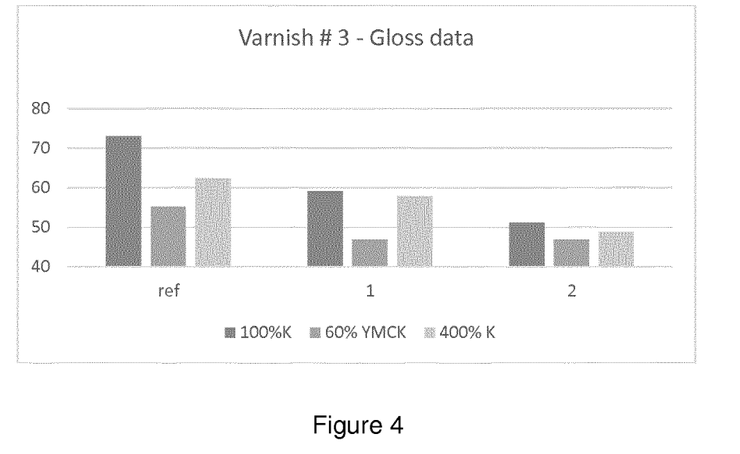
Figure 5:
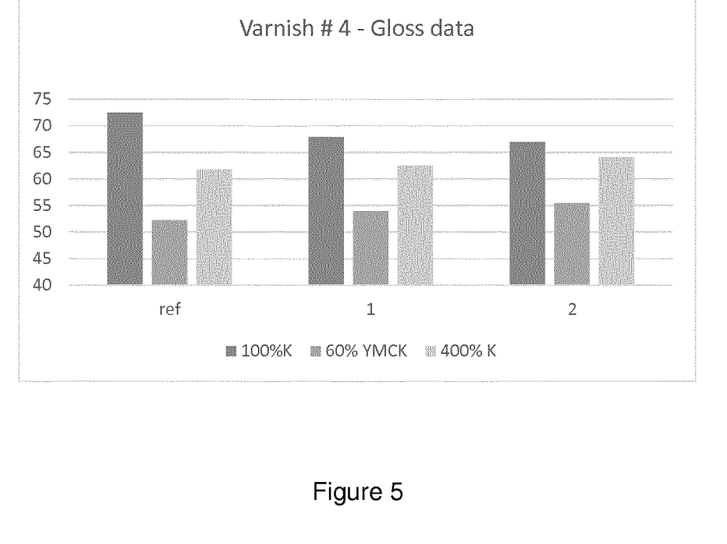
Figure 6:
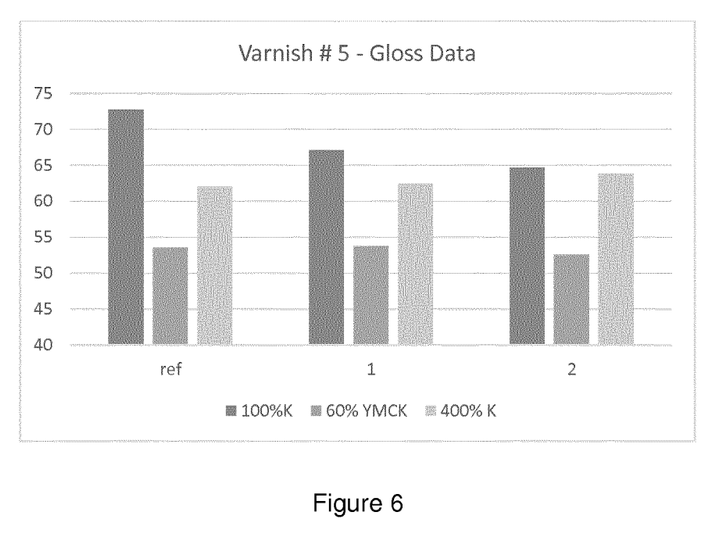

FIG. 1 shows the weights of ink-debris (in mg) removed from varnished-prints (1 separation of varnish, ~1.2-1.5 μgm in average thickness) of different the varnish formulations (#1 to #5) and of the ink composition only (i.e. no varnish), printed on 400% coverage prints (EI4.0 based-ink with YMCK separation order). Such results illustrates that liquid electrophotographic varnish composition according to the present disclosure improves the resistance and durability of the printed media. cl Example 3

Varnish Ink Dispersions Performances on Gloss

A media (Euroart® substrate, 135 gsm) is used in an indigo press (HP Indigo 7500, Series 3) with the commercially available Electroink 4.5 at 100% K, 60% YMCK and 400% K. The varnish compositions # 1 to 5 are applied/printed the colored image assembled by YMCK (yellow, magenta, cyan and key [i.e. black]) separation or part of them at a desired sequence to the resulting print media. The varnish compositions # 1 to 5 are applied one or several times (i.e. one or several hits). Gloss measurement)(75°) for the different printed article with the various varnish compositions # 1 to 5 are done. The measurements are done with a micro-gloss at 75 degree (from BYK) and gloss data is obtained in a push-of-a-bottom process. The print is placed on a white blank page followed by measurement. The sensor of the micro-gloss instrument covers all the print.

FIGS. 2 to 6 illustrate the results of the gloss tests. FIGS. 2 to 6 show the 75° Gloss measurement for all media after 1, 2 or 3 hits or without varnish layers. The reference being the media without varnish (ref.). Such results demonstrate that, when varnish compositions according to the present disclosure (varnish compositions #4 and 5) are applied to a printed image, the level of gloss is maintained, or even improved, over the hits. On the opposite, comparative varnish compositions (varnish compositions #1, 2 and 3) tend to have a gloss that decreased over the hits.

The invention claimed is:

1. An electrophotographic varnish composition comprising, in a liquid carrier,
   a. an epoxy-based cross-linking agent;
   b. a mono-epoxy diluent;
   c. a polymeric resin;
   d. and a metal catalyst and/or a photo-initiator.

2. The electrophotographic varnish composition according to claim 1 wherein the mono-epoxy diluent is a linear mono-epoxy diluent, a branched mono-epoxy diluent or a mixture of linear and branched mono-epoxy diluents.

3. The electrophotographic varnish composition according to claim 1 wherein the mono-epoxy diluent is selected from the group consisting of 2-ethylhexyl glycidyl ether, glycidyl hexadecyl ether and dodecyl/tetradecyl glycidyl ether.

4. The electrophotographic varnish composition according to claim 1 wherein the mono-epoxy diluent is present in an amount representing from about 0.1 wt % to about 10 wt % of the total weight of the electrophotographic varnish composition.

5. The electrophotographic varnish composition according to claim 1 wherein the ratio epoxy-based cross-linking agent/mono-epoxy diluent is between 1/1 and 1/0.8.

6. The electrophotographic varnish composition according to claim 1 wherein the epoxy-based cross-linking agent is present in an amount representing from about 0.1 wt % to about 10 wt % of the total weight of the electrophotographic varnish composition.

7. The electrophotographic varnish composition according to claim 1 wherein the epoxy-based cross-linking agent has a molecular weight of 5000 Daltons or less.

8. The electrophotographic varnish composition according to claim 1 wherein the epoxy-based cross-linking agent is of the formula $(X)\text{-}(Y[Z\text{-}F]_m)_n$ wherein, in each $(Y[Z\text{-}F]_m)_n$, Y, Z and F are each independently selected, such that F is an epoxide of the formula $-CH(O)CR^2H$, wherein $R^1$ is selected from H and alkyl; Z is alkylene; Y is selected from (i) a single bond, $-O-$, $-C(=O)-O-$, $-O-C(=O)-$ and m is 1 or (ii) Y is $-NH_{2-m}$, wherein m is 1 or 2; n is at least 1, and X is an organic group.

9. The electrophotographic varnish composition according to claim 1 wherein the epoxy-based cross-linking agent is selected from the group consisting of 1,2,7,8-diepoxy octane; trimethylolpropane triglycidyl ether, resorcinol diglycidyl ether; N,N-diglycidyl-4-glycidyloxyaniline; 4,4'-Methylenebis(N,N-diglycidylaniline); tris(4-hydroxyphenyl)methane triglycidyl ether; diglycidyl 1,2-cyclohexanedicarboxylate; 1,4-cyclohexanedimethanol diglycidyl ether; tris(2,3-epoxypropyl) isocyanurate; neopentyl glycol diglycidyl ether; bisphenol-A diglycidyl ether; bisphenol-A propoxylate diglycidyl ether; 3,4-epoxycyclohexylmethyl 3,4-epoxycyclohexanecarboxylate; poly[(o-cresyl glycidyl ether)-co-formaldehyde]; poly(ethylene-co-glycidyl methacrylate); poly(ethylene-co-methyl acrylate-co-glycidyl methacrylate); poly(bisphenol A-co-epichlorohydrin) glycidyl end-capped; poly(ethylene glycol) diglycidyl ether and poly(propylene glycol) diglycidyl ether.

10. The electrophotographic varnish composition according to claim 1 wherein a metal catalyst is present in an amount representing less than 5 wt % of the total weight of the electrophotographic varnish composition and is a chromium complex or a zinc complex.

11. The electrophotographic varnish composition according to claim 1 wherein a photo-initiator is present in an amount representing from about 0.01 to about 10 wt % of the total weight of the electrophotographic varnish composition and is a cationic photo-initiator.

12. The electrophotographic varnish composition according to claim 1 wherein the polymeric resin comprises two different polymers having acidic side groups that are co-polymers of ethylene and an ethylenically unsaturated acid of either acrylic acid or methacrylic acid or ionomers thereof.

13. The electrophotographic varnish composition according to claim 1 that further comprises a charge director.

14. An article comprising a substrate printed with an electrophotographic ink composition and with an electrophotographic varnish composition comprising in a liquid carrier, an epoxy-based cross-linking agent; a mono-epoxy diluent; a polymeric resin; and a metal catalyst and/or a photo-initiator.

15. A method of manufacturing an electrophotographic varnish composition comprising mixing, in a carrier liquid, a polymeric resin, an epoxy-based cross-linking agent, a mono-epoxy diluent, and a metal catalyst and/or a photo-initiator to form the electrophotographic composition.

* * * * *

UNITED STATES PATENT AND TRADEMARK OFFICE
CERTIFICATE OF CORRECTION

| | |
|---|---|
| PATENT NO. | : 10,139,742 B2 |
| APPLICATION NO. | : 15/547744 |
| DATED | : November 27, 2018 |
| INVENTOR(S) | : Tony Azzam et al. |

Page 1 of 1

It is certified that error appears in the above-identified patent and that said Letters Patent is hereby corrected as shown below:

In the Claims

In Column 23, Line 22 approx., Claim 8, delete "$(X)-(Y[Z-F]_m)_n$" and insert -- $(X)-(Y-[Z-F]_m)_n$ --, therefor.

In Column 23, Lines 22-23 approx., Claim 8, delete "$(Y[Z-F]_m)_n$," and insert -- $(Y-[Z-F]_m)_n$, --, therefor.

Signed and Sealed this
Second Day of April, 2019

Andrei Iancu
*Director of the United States Patent and Trademark Office*